No. 630,540. Patented Aug. 8, 1899.
F. A. HODGMAN.
APPARATUS FOR FINISHING RUBBER CLOTH.
(Application filed Oct. 21, 1898.)
(No Model.)
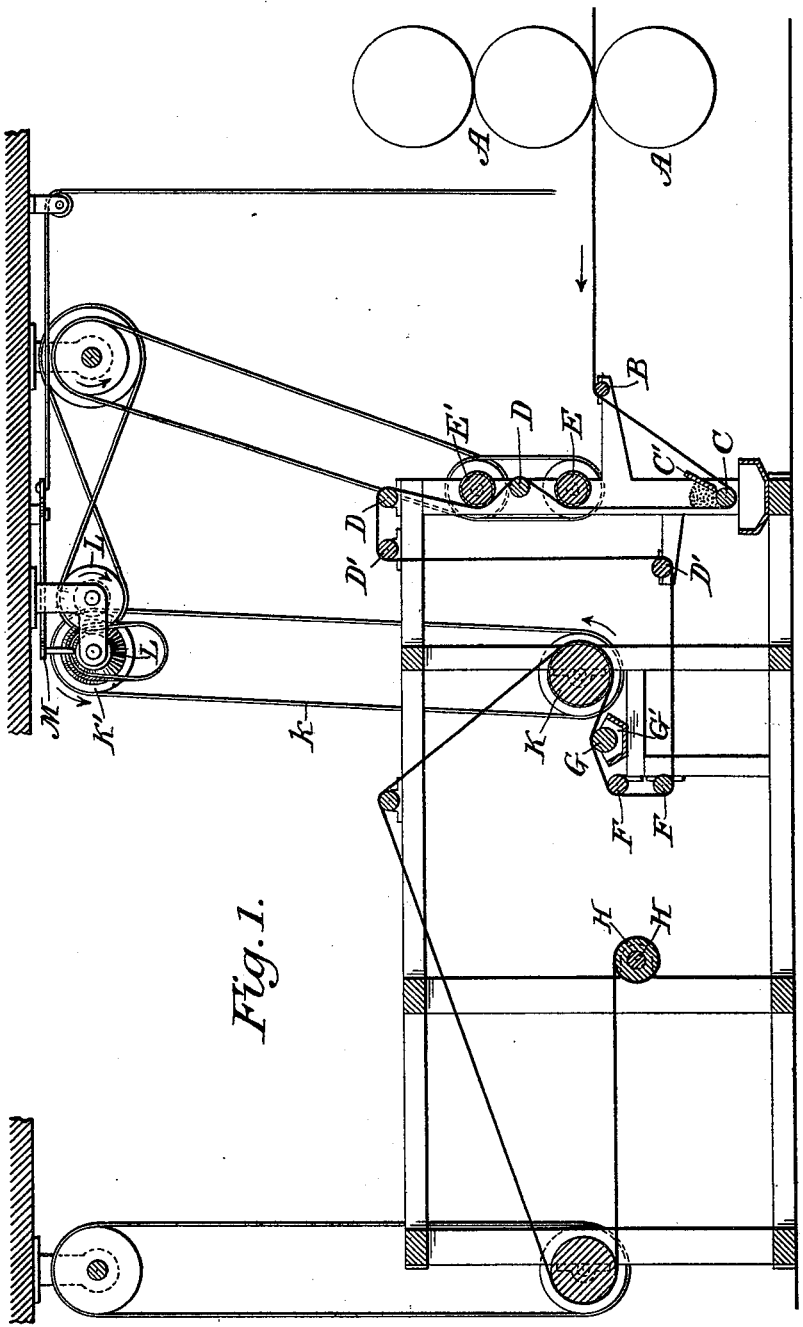
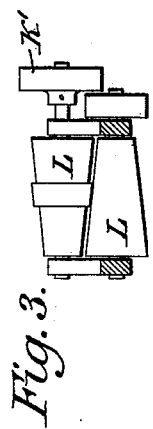
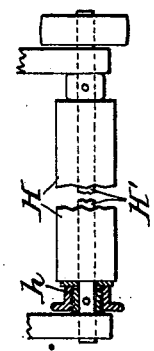
Attest:
A. N. Jesbera
F. M. Eggleston
Inventor:
Frederick A. Hodgman
by Redding, Kiddle & Greeley
Attys.
THE NORRIS PETERS CO., PHOTO-LITHO., WASHINGTON, D. C.

UNITED STATES PATENT OFFICE.

FREDERICK A. HODGMAN, OF TUCKAHOE, NEW YORK.

APPARATUS FOR FINISHING RUBBER CLOTH.

SPECIFICATION forming part of Letters Patent No. 630,540, dated August 8, 1899.

Application filed October 21, 1898. Serial No. 694,166. (No model.)

*To all whom it may concern:*

Be it known that I, FREDERICK A. HODGMAN, a citizen of the United States, residing in Tuckahoe, in the county of Westchester, State of New York, have invented certain new and useful Improvements in Apparatus for Finishing Rubber Cloth, &c., of which the following is a specification, reference being had to the accompanying drawings, forming a part hereof.

This invention relates to the finishing of rubber cloth, &c., with what is known in the trade as "dull" finish as distinguished from gloss and other kinds of finish. Heretofore the rubber cloth as it comes from the calendar-rolls has a tacky surface, and is therefore floured with wheat-flour, starch, soapstone, or some other suitable powder in order that it may be handled. Then it is vulcanized in the piece or is first made up into coats, blankets, &c., and then vulcanized. In either case after being vulcanized the cloth has to be thoroughly scrubbed in order to remove the superfluous powder and must finally be dried in the air in order to remove a slight tackiness which still remains. The finish thus produced is what is known as the "dull" finish.

The present invention has for its object to produce the same dull finish without requiring the cloth to be scrubbed and sun-dried, which steps add materially to the cost of production of the cloth.

The invention consists in apparatus for producing the dull finish.

In accordance with the invention the cloth is floured as it comes from the calendar-rolls and is then treated with a varnish or ink and dried. The action of the varnish or ink upon the floured surface produces the dull finish, and no scrubbing or sun-drying or other treatment whatsoever is required to complete the finishing of the surface, it being understood that the cloth is vulcanized either in the piece or when made up, as may be required. The vulcanizing, however, has no relation to the production of the surface finish, and the cloth may be shipped before vulcanizing, if necessary.

In the drawings, Figure 1 is a view, partly in section and partly in outline, representing the apparatus hereinbefore referred to. Fig. 2 is a detail view of a wind-up roll employed in the apparatus, and Fig. 3 is a detail view of the variable-speed device hereinafter referred to.

In the drawings, the usual calendar-rolls by which the rubber or rubber composition is applied to the fabric are represented at A. From these the rubber cloth, with its surface still tacky, passes over the guide-roll B and under a flouring-roll C. The flour, of whatever kind, is placed above the roll C, and a blade C' serves to keep the flour in contact with the cloth as it passes upward from the roll, as well as to prevent an excessive amount of the flour from passing beneath the roll. After leaving the flouring device the cloth is led over suitable guide-rolls, as D D', in contact with one or more revolving brush-rolls, as E E', by which the superfluous flour is removed from the surface of the cloth, the said rolls being driven, preferably in a direction contrary to the movement of the cloth, by any suitable means. The cloth is then reversed by being passed around suitable guide-rolls, as F F, so as to bring its floured rubber surface down, and is passed over a varnishing or inking device, which may conveniently consist of a roll G, rotating freely in a trough G'. Any suitable varnish or ink may be placed in the trough G'. A desirable preparation for the purpose consists of rubber, benzine or naphtha, and lampblack, just enough rubber being used to hold the lampblack. This varnish or ink is especially satisfactory, because in making up the cloth into garments or other articles no sandpapering at the seams is necessary, as when a shellac varnish, for example, is employed, since the cement used will take hold of the surface at once. From the varnishing device the cloth passes to the wind-up, the path being made sufficiently long to permit the varnish or ink to dry, which takes place rapidly. In the drawings the wind-up roll is represented at H, and, as usual, the roll is driven frictionally to compensate for the increasing diameter of the roll as the cloth is wound thereon. In Fig. 2 the roll is represented as mounted on its shaft H' loosely and driven therefrom through an adjustable friction device, (indicated at *h.*) The tension of the cloth is somewhat variable by reason of the slipping of the wind-up roll upon its shaft, and it is found that any jerky movement of the cloth over the inking or varnishing device destroys the uniformity of the finish, a difference in appearance being caused whenever the cloth is jerked over the inking device. It is desirable, therefore, to regulate the movement of the cloth over the inking device so as to prevent such jerking, and to this end a regulating feed device is interposed between the varnishing or inking device and the wind-up roll. Accordingly in the apparatus shown in the drawings the cloth is led from the varnishing or inking device about a feed-roll K, which is preferably covered with emery or is otherwise roughened, so that it shall have some hold upon the cloth. This roll is driven, as by means of a belt $k$, from a pulley K', and inasmuch as the cloth sometimes adheres more or less to the calendar-roll and is carried with it for a short distance, thereby tending to occasion differences in the tension of the cloth, means are provided whereby the speed of the feed-roll K may be increased or decreased readily, such means being under the control of the operator at the calendar-rolls. Any variable-speed device of usual or suitable construction may be employed for the purpose. The device represented in the drawings consists of the ordinary friction-cones L, with a belt-shipper M, under control of the operator at the calendar-roll. By these means it is possible to avoid any irregularity in the travel of the cloth which would occasion a lack of uniformity in the finish.

It will be understood that the invention is not to be restricted to the particular arrangement shown and described herein.

I claim as my invention—

1. In an apparatus for finishing rubber cloth, &c., the combination of a device for applying a flouring substance upon the fabric, a device for varnishing or inking the fabric after it is floured, and means for actuating said last-named device.

2. In an apparatus for finishing rubber cloth, &c., the combination of a device for applying a flouring substance upon the fabric, a device for varnishing or inking the floured fabric, a wind-up for the fabric, and a regulating feed device for the fabric.

3. In an apparatus for finishing rubber cloth, &c., the combination of a device for applying a flouring substance upon the fabric, a device for varnishing or inking the floured fabric, a wind-up for the fabric, a regulating feed-roll interposed between the varnishing or inking device and the wind-up and a variable-speed device for regulating said feed-roll.

This specification signed and witnessed this 18th day of October, A. D. 1898.

FREDERICK A. HODGMAN.

In presence of—
H. C. MERRITT,
C. A. HODGMAN.